United States Patent
Jones et al.

(10) Patent No.: US 9,182,808 B1
(45) Date of Patent: Nov. 10, 2015

(54) LOW-POWER NETWORK STACKS AND DRIVER SUBSETS

(71) Applicant: Marvell International Ltd., Hamilton (BM)

(72) Inventors: R. Douglas Jones, Meridian, ID (US); Gordon R. Clark, Meridian, ID (US)

(73) Assignee: Marvell International Ltd., Hamilton (BM)

( * ) Notice: Subject to any disclaimer, the term of this patent is extended or adjusted under 35 U.S.C. 154(b) by 350 days.

(21) Appl. No.: 13/738,247

(22) Filed: Jan. 10, 2013

Related U.S. Application Data

(60) Provisional application No. 61/586,069, filed on Jan. 12, 2012.

(51) Int. Cl.
*G06F 1/32* (2006.01)
*H04L 12/24* (2006.01)

(52) U.S. Cl.
CPC ............ *G06F 1/3287* (2013.01); *G06F 1/3209* (2013.01); *G06F 1/3234* (2013.01); *H04L 12/2403* (2013.01)

(58) Field of Classification Search
CPC ....... G06F 1/32; G06F 1/3206; G06F 1/3209; G06F 1/3287
USPC ................................................... 713/320, 323
See application file for complete search history.

(56) References Cited

U.S. PATENT DOCUMENTS

| | | | | |
|---|---|---|---|---|
| 5,546,538 A | * | 8/1996 | Cobbley et al. | 709/203 |
| 6,289,464 B1 | * | 9/2001 | Wecker et al. | 713/300 |
| 6,631,469 B1 | * | 10/2003 | Silvester | 713/2 |
| 7,343,484 B2 | * | 3/2008 | Du et al. | 713/2 |
| 7,424,632 B2 | * | 9/2008 | Powers et al. | 713/323 |
| 8,707,406 B2 | * | 4/2014 | Tosey | 726/7 |
| 2003/0210658 A1 | * | 11/2003 | Hernandez et al. | 370/311 |

* cited by examiner

Primary Examiner — Chun Cao

(57) ABSTRACT

The present disclosure describes apparatuses and techniques for low-power alternate firmware. In some aspects, data packets are received from a network interface via a reduced-feature-set network stack implemented on a subset of hardware. The reduced-feature-set network stack is used to respond to some of the data packets. When a determination is made that the reduced-feature-set network stack is not capable of responding to others of the data packets, an increased-feature-set network stack is implemented via another subset of the hardware.

20 Claims, 7 Drawing Sheets

LOW-POWER NETWORK STACKS AND DRIVER SUBSETS

RELATED APPLICATION

This present disclosure claims priority under 35 U.S.C. §119(e) to U.S. Provisional Patent Application Ser. No. 61/586,069 filed Jan. 12, 2012, the disclosure of which is incorporated by reference herein in its entirety.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Computing and electronic devices often communicate over a network to access data, services, or functionalities provided by other devices. These other devices are typically configured as network devices that may be discovered, configured, or accessed by a host device over the network. To enable interaction with a host device, a network device maintains a network presence by broadcasting or advertising information in accordance with various network protocols, such as discovery or addressing protocols.

Some network protocols used to maintain a network presence, however, communicate via higher layers of a network stack that utilize more-complex resources of a network device. Because more-complex resources consume additional power, it is often desirable to power down these resources during periods of inactivity in order to conserve power. Maintaining a network device's network presence, however, often prevents the more-complex resources from being powered-down which can result in higher-than-necessary power consumption.

SUMMARY

This summary is provided to introduce subject matter that is further described below in the Detailed Description and Drawings. Accordingly, this Summary should not be considered to describe essential features nor used to limit the scope of the claimed subject matter.

A method is described for receiving, via a reduced-feature-set network stack, data packets from a network interface, responding to the data packets to which the reduced-feature-set network stack is capable of responding, and determining when the reduced-feature-set network stack is not capable of responding to one or more of the data packets received from the network interface. An increased-feature-set network stack is then implemented to respond to the one or more data packets to which the reduced-feature-set network stack is not capable of responding.

Another method is described for receiving a wake notification associated with a data packet, determining a subset of hardware resources of a device that is capable of processing the data packet based on the wake notification, waking the subset of hardware resources from a low-power state to process the data packet, and returning the subset of hardware resources to the lower-power state after the data packet is processed.

A System-on-Chip is described that includes a power manager configured to execute a first set of code to implement the reduced-feature-set network stack for responding to data packets received via a network interface, determine when the reduced-feature-set network stack is not capable of responding to one or more of the data packets received via the network interface, and transition from execution of the first set of code to execution of a second set of code effective to enable the full-feature-set network stack to respond to the one or more data packets.

The details of one or more implementations are set forth in the accompanying drawings and the description below. Other features and advantages will be apparent from the description and drawings.

BRIEF DESCRIPTION OF THE DRAWINGS

Aspects of low-power firmware are described with reference to the following figures. In the figures, the left-most digit of a reference number identifies the figure in which the reference number first appears. The use of the same reference numbers in different instances in the description and the figures indicate like elements.

DETAILED DESCRIPTION

Conventional techniques for maintaining a network presence in a low-power state reduce device functionality, consume more power than necessary, and/or rely on costly additional hardware. For example, a conventional sleep state often powers down hardware resources to a point at which network functionality is lost, resulting in user confusion or frustration. In other cases, a larger-than-necessary subset of hardware resources is left powered during the sleep state which results in additional power consumption. In yet other cases, dedicated low-power hardware added to support network operation in the sleep state increases design complexity, takes up device space, and increases costs due to hardware fabrication.

This disclosure describes apparatuses and techniques for low-power firmware, which enable a low-power firmware to operate over a subset of existing hardware resources associated with a system firmware. The low-power firmware implements, via the subset of hardware resources, a reduced-feature-set network stack capable of responding to network requests that do not traverse higher levels of a network stack. Responding to these lower-level network requests enables, at least in part, a network device in a low-power state to maintain a presence on a network to which the network device is attached.

The low-power firmware passively filters network traffic to determine when packet processing via the higher levels of the network stack is necessary. When necessary, a transition can be made to the system firmware that implements an increased-feature-set network stack using additional hardware resources. The increased-feature-set network stack is capable of processing higher-level packets, yet consumes more power than the reduced-feature-set network stack. Once packet processing is complete via the increased-feature-set network stack, a transition is made back to the low-power firmware to conserve power. By so doing, the network device effectively maintains a full network presence using a minimal subset of hardware resources.

The following discussion describes an operating environment, techniques that may be employed in the operating environment, and a System-on-Chip (SoC) in which components of the operating environment can be embodied. In the discussion below, reference is made to the operating environment by way of example only.

Figure 1:
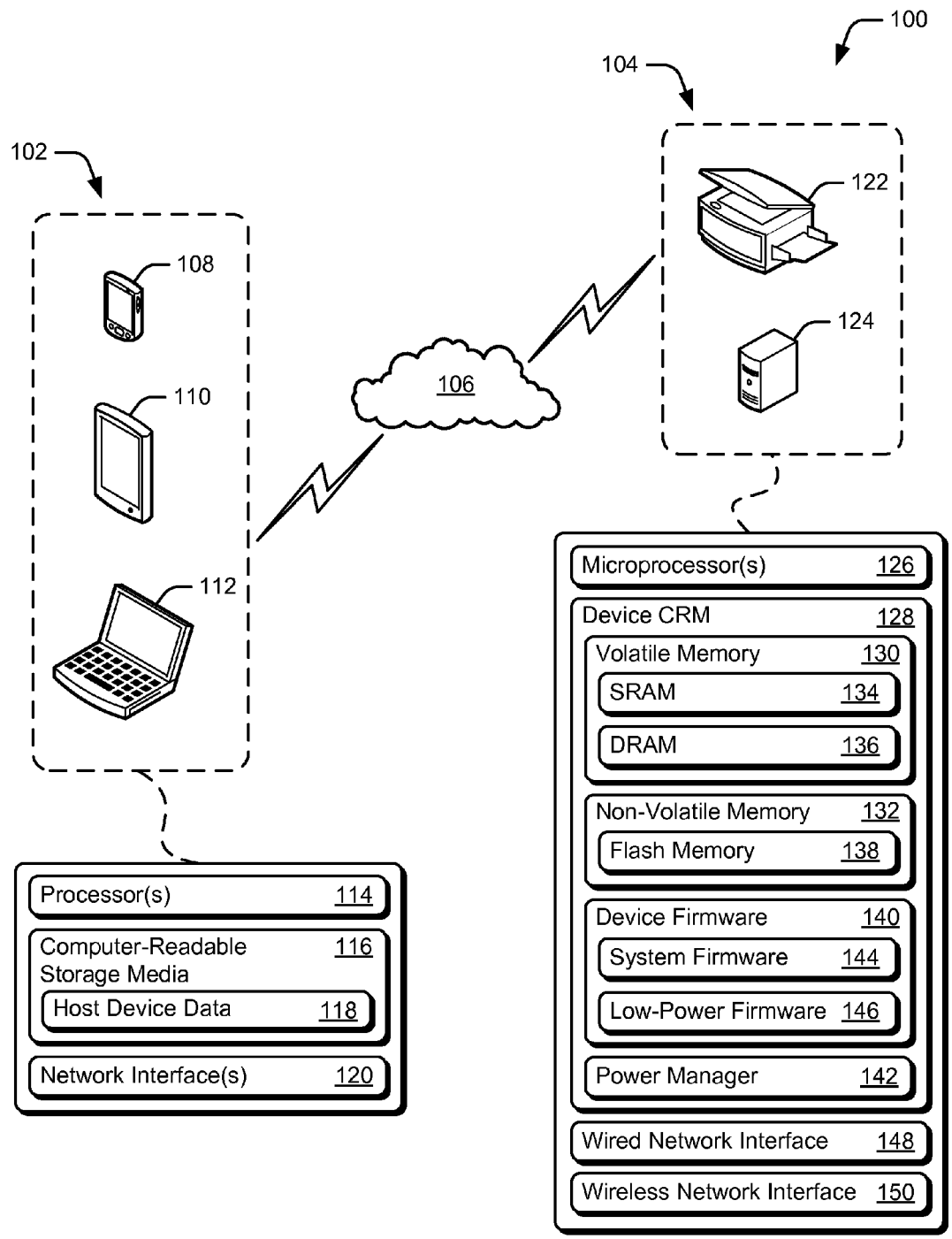
FIG. 1 illustrates an operating environment in which aspects of low-power firmware can be implemented.

FIG. 1 illustrates an example operating environment 100 in which aspects of low-power firmware can be implemented. As shown in FIG. 1, the example operating environment 100 includes host devices 102, network devices 104, and a network 106. The host devices 102 are each capable of communicating, accessing, presenting, and/or processing various data, such as data accessed via network 106. The host devices 102 include a smart-phone 108, tablet computer 110, and laptop computer 112. Although not shown, other configurations of the host devices 102 are also contemplated, such as a desktop computer, server, mobile-internet device (MID), gaming console, mobile hotspot, networked media player, and so on.

Each host device 102 includes processor(s) 114 (e.g., an application processor) and computer-readable storage media 116 (CRM 116). The processor 114 may include any suitable number and/or type of processing cores, which may be configured in any suitable manner. The CRM 116 may include any suitable type and/or combination of volatile memory and non-volatile memory (not shown), such as random-access memory (RAM), static random access memory (SRAM), dynamic random-access memory (DRAM), double-data-rate RAM (DDR), and the like.

The CRM 116 includes host device data 118, which may comprise operating systems, applications, or user data (not shown) of host device 102. The operating systems or applications of the host device 102 may be stored by, or executed from, the volatile memory or the non-volatile memory of CRM 116. Alternately or additionally, the operating systems and/or applications of host device 102 can be embodied as firmware or other processor-executable instructions, binaries, or code. The operating systems and applications of the host device 102 are executable by the processor 114 to provide a user interface, various functionalities, and/or services of host device 102.

The host devices 102 also include network interface(s) 120 which provide connectivity to the network 106 and the network devices 104 connected therewith. Data communicated over the network interfaces 120 may be packetized or framed in accordance with a communication protocol or standard by which a host device 102 is communicating. The network interfaces 120 may include wired interfaces, such as Ethernet, serial, universal serial bus (USB) or fiber optic interfaces for communication over a local area network (LAN), intranet, or the Internet. Alternately or additionally, the network interfaces 120 may also include wireless interfaces that facilitate communication over wireless networks, such as wireless LANs, cellular networks, or wireless personal-area-networks (WPANs).

The network interfaces 120 enable the host devices 102 to communicate with the network devices 104 through the network 106. The network 106 may include a wired network, a wireless network, or any suitable combination thereof. In some aspects, the network 106 is configured as a LAN, WLAN, intranet, virtual private network (VPN), WPAN, and/or the like. Although not shown, the network 106 may be implemented using any suitable networking components, such as routers, network switches, access points, firewalls, and so on.

The network devices 104 provide services or resources to the host devices 102 through the network 106. In this particular example, the network devices 104 include a multi-function printer 122 and a network attached storage drive (NAS) 124. Although not shown, other configurations of the network devices 104 are also contemplated, such as a scanner, camera, webcam, media server, file server, and so on. The network devices 104 provide a variety of services or resources, such as printing, scanning, faxing, data storage, media streaming, imaging, and/or the like.

Each network device 104 includes microprocessor(s) 126 and device computer-readable storage media 128 (device CRM 128). The microprocessors 126 may include any suitable number and/or type of processing cores, which can be configured in any suitable manner. For example, the microprocessors 126 may be configured as a high performance dual core application processor and a lower performance single core side processor. Alternately or additionally, an operating frequency and/or voltage of a microprocessor 126 may be adjustable to vary performance or power consumption of the microprocessor 126. For example, in a low-power state, the operating frequency of the microprocessor 126 can be reduced to conserve power.

Device CRM 128 includes volatile memory 130 and non-volatile memory 132. The volatile memory 130 includes static random access memory 134 (SRAM 134) and synchronous dynamic random-access memory 136 (DRAM 136). Various code or instructions of the network device 104 can be stored by, and executed from, the SRAM 134 or DRAM 136. Alternately or additionally, the volatile memory 130 may include other suitable types of memory, such as random-access memory (RAM), asynchronous dynamic RAM, double-data-rate RAM (DDR), and the like. The non-volatile memory 132 includes flash memory 138, which may store data of a network device 104 persistently when powered-down. Alternately or additionally, the non-volatile memory 132 may include other suitable types of memory such as non-volatile RAM (NVRAM), read-only memory (ROM), one-time programmable (OTP) memory, and the like.

The device CRM 128 also includes device firmware 140 and a power state manager 142 (power manager 142). The device firmware 140 may be embodied as one or more sets of firmware, or other processor-executable instructions, binaries, or code. In some aspects, the device firmware 140 includes system firmware 144 and low-power firmware 146. The system firmware 144 is implemented to manage the network device 104 in a partial wake state or full-on state, such as when providing resources or services to a host device 102. The low-power firmware 146 is implemented to manage a subset of hardware resources of network device 104 during low-power states, such as sleep or idle states of the network device 104. The implementation and use of the system firmware 144 and the low-power firmware 146 varies and is described below.

The power manager 142 is implemented to manage the execution of the device firmware 140. In this particular example, the power manager 142 manages execution of the system firmware 144 and low-power firmware 146. In some aspects, various functionalities of the power manager 142 are implemented by the system firmware 144 and low-power firmware 146. These functionalities enable power manager 142 to transition execution of the system firmware 144 to, or from, execution of the low-power firmware 146. The implementation and use of the power manager 142 varies and is described below.

The network device 104 also includes a wired network interface 148 and/or a wireless network interface 150 for communicating via the network 106. The wired network interface 148 may be configured as any suitable type of interface, such as an Ethernet, serial, universal serial bus (USB), or fiber optic interface. The wireless network interface 150 may also be configured as any suitable type of interface, such as a WLAN, WPAN, or cellular network interface. The network device 104 communicates data via the wired network interface 148 or the wireless network interface 150 to maintain a presence on network 106. Data communicated over the wired network interface 148 or the wireless network interface 150 may be packetized or framed in accordance with a communication protocol or standard by which the network device 104 is communicating.

Figure 2:
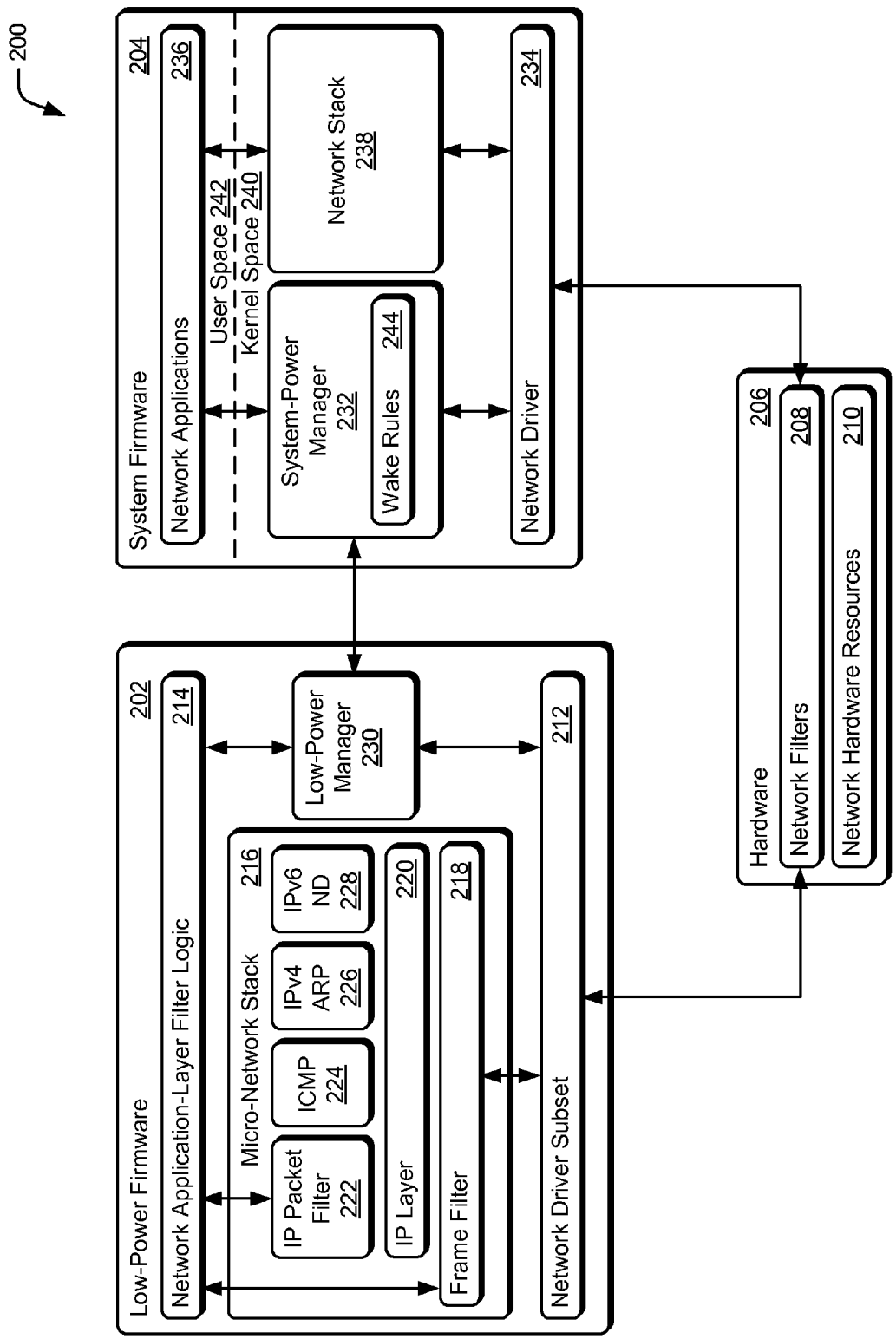
FIG. 2 illustrates an example firmware architecture according to some aspects of low-power firmware.

FIG. 2 illustrates an example firmware architecture 200 in which aspects of low-power firmware can be implemented. The example firmware architecture 200 includes low-power firmware 202 and system firmware 204, such as the low-power firmware 146 and system firmware 144 described with reference to FIG. 1. The low-power firmware 202 and the system firmware 204 are implemented to manage hardware 206 of a network device. For example, the low-power firmware 202 and the system firmware 204 can leverage resources of the hardware 206 to enable a network device to maintain a network presence across various power states.

The hardware 206 of the network device includes network filters 208 (filters 208) and network hardware resources 210 (hardware resources 210) of one or more network interfaces (e.g., Ethernet, WLAN, or WPAN). The filters 208 can be configured to use the most precise filtering available, such as destination media access control (MAC) address filtering or hash filtering. Alternately or additionally, hardware checksum offloading can be leveraged by the filters 208 to reduce computational load on a processor when the low-power firmware 202 is executing.

Although not shown, the hardware 206 may also include other hardware components or subsystems of the network device, such as power management, input/output logic, displays, motor control systems, and the like. In this particular example, the filters 208 and hardware resources 210 are configured to communicate data via a network interface, such as the wired network interface 148 or the wireless network interface 150 described with reference to FIG. 1.

The low-power firmware 202 is implemented to provide a network driver subset 212, network application-layer filter logic 214 (filter logic 214), and a micro-network stack 216, which is a reduced-feature-set network stack. The low-power firmware 202 can be executed using low power hardware, such a side processor executing code from a small SRAM memory area (e.g., 128 KB or less). This can be effective to permit a main processor and other memories of a network device to be powered down while the low-power firmware 202 executes. Thus, execution of the low-power firmware 202 in a low-power or sleep state can reduce power consumption of the network device.

In some aspects, execution of the low-power firmware 202 enables the network device to actively respond to at least some network requests effective to maintain a network presence. The low-power firmware 202 operates over a subset of the hardware resources 210 via the network driver subset 212. Other hardware resources 210 not in this subset can be powered down or reconfigured to conserve power. In some cases, a data rate of a network interface may be reduced to reduce data flow or offload data buffering for other network entities. For example, an Ethernet interface may be set to 10 Baseband T to force a network switch to buffer data packets received from higher speed host devices. This can be effective to enable the low-power firmware 202 to utilize smaller memory areas for buffering received data packets.

The network driver subset 212 transmits data frames or packets to a frame filter 218 and Internet-protocol (IP) layer 220 of the micro-network stack 216 for processing or filtering. Using the micro-network stack 216 to respond to some data packets or requests enables the network device to maintain a network presence while in a low-power state. The micro-network stack 216 is configured to respond to packet types that do not traverse upper layers of a network stack, such as Internet control message protocol (ICMP) messages, IP version 4 (IPv4) address resolution protocol (ARP) messages, or IP version 6 (IPv6) neighbor discovery (ND) requests. Other packet types associated with the upper layers of the network stack are filtered to determine if the packets may be discarded or if the packets should be queued for delivery to the upper layers of the network stack.

The frame filter 218 and IP packet filter 222 can analyze a frame header and contents of the packet, respectively, to identify potential "wake trigger packets" which can then be forwarded to the filter logic 214. The filter logic 214 can then discard or queue the other packets for delivery to upper layers in order to maintain network presence and/or appear responsive to host devices. By responding only to packet types that do not traverse upper layers of a network stack, the micro-network stack 216 reduces dependencies on hardware resources allowing the network device to operate within a reduced feature set and conserve power.

The micro-network stack 216 includes an ICMP module 224 (ICMP 224), an IPv4 ARP module 226 (IPv4 ARP 226), and an IPv6 ND module 228 (IPv6 ND 228), each of which is configured to respond to corresponding Internet-layer or network-layer data packets received from IP layer 220. For example, the ICMP module 224 is implemented to respond to ICMP packets or requests received via the network driver subset 212. Accordingly, the micro-network stack 216 enables the network device to appear network aware and responsive to other network entities communicating via these lower layer network protocols.

The filter logic 214 is implemented to filter packets that are not processed or responded to by the micro-network stack 216. The filter logic 214 is configured to determine when these other packets necessitate a response from, or processing by, a higher layer of a network stack. For example, in the context of FIG. 1, filter logic 214 can determine when to respond to network traffic such that a network device 104 appears present and responsive to the host devices 102 associated with the network 106. When an increased-feature-set network stack is necessary for packet processing, a transition to the system firmware 204 can be initiated via a low-power manager 230. If filter logic 214 determines that an incoming packet requires no further processing or response in order for the network device to appear present and responsive to the host devices 102, it may discard the packet without further processing, response, or other action.

The low-power manager 230 can coordinate an initiation of the system firmware 204 with a system-power manager 232. For example, if a side processor of the network device is executing the low-power firmware 202 from SRAM, the low-power manager 230 can initiate execution of the system firmware 204 from DRAM by a main processor of the network device. The low-power manager 230 can then transition data packet processing (i.e., network responsibilities) to the system-power manager 232 of the system firmware 204. Alternately or additionally, the low-power manager 230 and system-power manager 232 may be implemented as a combined power manager, such as the power manager 142 as described with reference to FIG. 1.

In some aspects, the low-power manager 230 transitions an incoming network packet buffer chain to the system firmware 204 for processing. After initiating a wake notification to the system firmware 204, the low-power manager 230 causes the low-power firmware 202 to continue queuing received packets into a memory, such as an area of SRAM configured as receive buffers. The low-power manager 230 then transfers or copies the queued data packets from the memory to another memory associated with the system firmware 204, such as a portion of DRAM configured as a receiving descriptor ring of a system network driver. Responsibility of interrupt service routine (ISR) processing is then transferred from the low-power manager 230 to the system-power manager 232 of the system firmware 204. The low-power manager 230 then communicates information to the system firmware 204 describing reasons for initiating the wake notification, which can be useful to process the data packets transferred from the low-power firmware 202.

The system firmware 204 is implemented to provide a network driver 234, network applications 236, and a network stack 238, which is a full-feature-set network stack. The system firmware 204 can be executed using primary hardware, such as a main processor of a network device executing code from DRAM. This can be effective to implement a full-feature-set network stack and network applications while the system firmware 204 executes. The network driver 234 and network stack 238 are implemented in a kernel space 240 of the system firmware 204, while the network applications 236 are implemented in a user space 242 of the system firmware 204.

The system firmware 204 operates over the hardware resources 210 via the network driver 234. The system firmware 204 may operate over one or more subsets of the hardware resources 210, up to and including all of the hardware resources 210. By way of example, the system firmware 204 can implement an increased-feature-set network stack, which is capable of handling some data packets that traverse higher levels of a network stack, by operating over one or more subsets of the hardware resources 210. In the context of this example, other subsets of the hardware resources 210 can be powered down to conserve power. The network driver 234 communicates data frames or packets to the network stack 238 for processing.

The network stack 238 is configured to process and/or respond to packet types that traverse upper layers of a network stack, such as transport layer or application layer data packets. These packet types may include data frames or packets to which the micro-network stack 216 is not capable of responding. In some aspects, system-power manager 232 configures the network stack 238 based on wake rules 244 that describe subsets of driver resources or hardware resources necessary for processing particular packets or requests. The wake rules 244 may be protocol or application specific rules that the system-power manager 232 applies when execution of the system firmware 204 is initiated. Alternately or additionally, the wake rules 244 may include hooks into the user space 242 via custom input/output control (IOCTLS) or other interfaces (e.g., Linux Sysfs) to determine when processing of the packets is complete.

Figure 3:
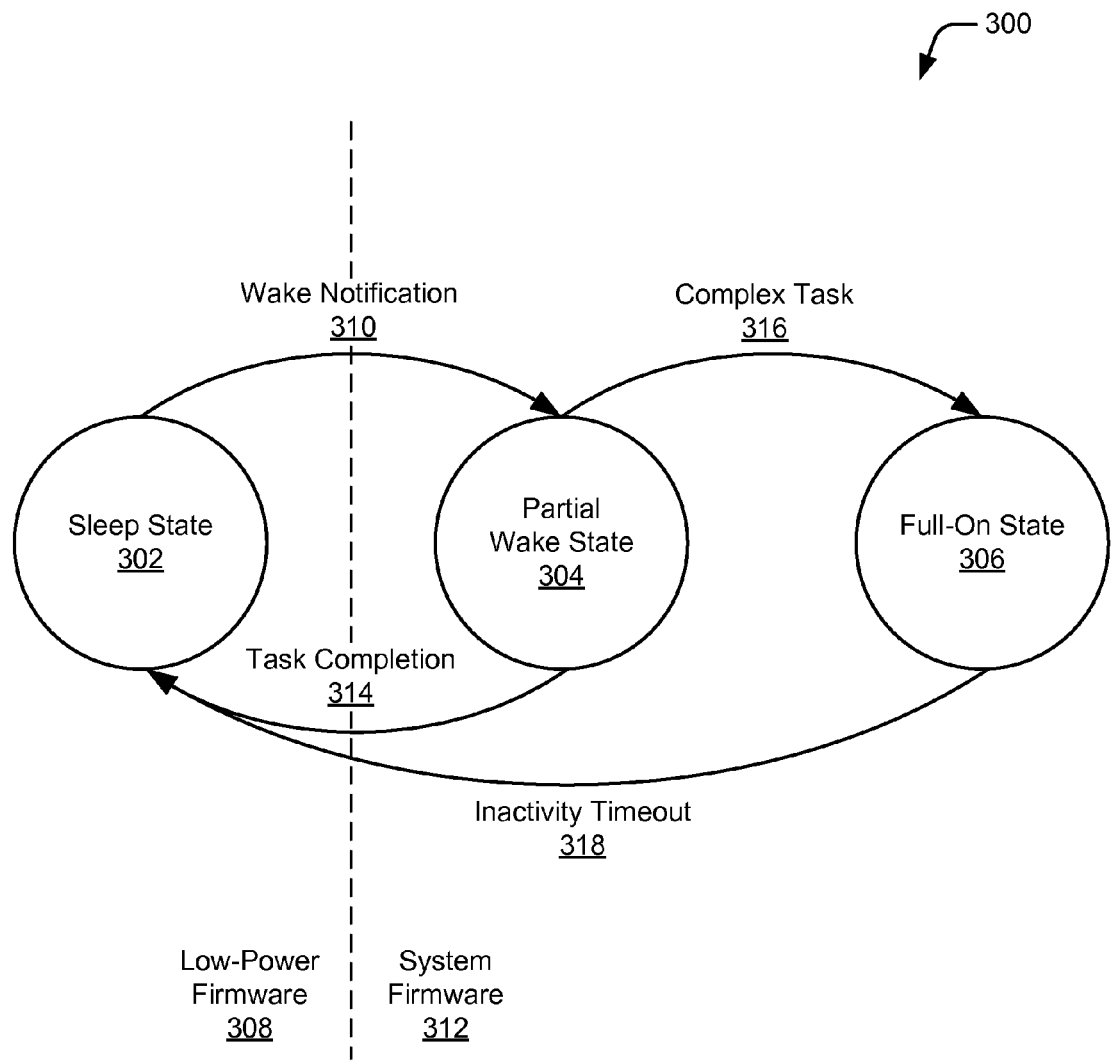
FIG. 3 illustrates example power states implemented in accordance with aspects of low-power firmware.

FIG. 3 illustrates example power states 300 implemented in accordance with various aspects of low-power firmware. The example power states include a sleep state 302, a partial wake state 304, and a full-on state 306. A network device may operate in these power states by executing a low-power firmware or a system firmware, such as the low-power firmware 202 and system firmware 204 described with reference to FIG. 2. While operating in the sleep state 302, the network device implements a low-power firmware 308, which may be similar to or the same as low-power firmware 202 described with reference to FIG. 2. Execution of low-power firmware 308 consumes a least amount of power while enabling the network device to maintain a network presence. Here, maintaining a network presence may include responding to requests of network peers or host devices.

While operating in the sleep state 302, the low-power firmware 308 responds to some types of network packets while filtering remaining packets to determine if further processing by higher network layers is necessary. For example, with reference to FIG. 2, the micro-network stack 216 may respond to ICMP messages, IPv4 ARP messages, or IPv6 ND requests while filter logic 214 filters the remaining packets. The filter logic 214 can indicate when further processing of the remaining packets is necessary by resources not available in the sleep state 302. When additional resources are needed for packet processing, the low-power firmware initiates a wake notification 310 to the system firmware.

From the sleep state 302, the network device can enter the partial wake state 304 or the full-on state 306 depending on an amount of resources needed for packet processing. The partial wake state 304 or the full-on state 306 are both implemented by the system firmware 312, which may be similar to or the same as system firmware 204 described with reference to FIG. 2. Execution of system firmware 312 enables access to additional resources that are not available under the low-power firmware. Alternately or additionally, a power manager of the network device can be implemented to determine, based on the wake notification 310, whether to enter the partial wake state 304 or the full-on state 306. For example, the power manager may apply a set of wake rules to the wake notification to determine whether to enter the partial wake state 304 or the full-on state 306.

When the remaining packets can be processed by resources available in the partial wake state 304, the network device enters the partial wake state 304. The partial wake state 304 consumes more power than the sleep state 302, yet less power than the full-on state 306. To reduce power consumption, resources needed to process the packets are powered and other resources are left in a low-power state or unpowered. For example, a subset of hardware resources may be powered-on based on applicable wake rules while transitioning from the sleep state 302 to the partial wake state 304.

This subset of hardware resources may enable an increased-feature-set network stack having more packet processing capabilities than a reduced-feature-set network stack implemented by the low-power firmware. The packets can then be processed in the partial wake state 304 before returning to the sleep state 302 upon task completion 314. In some aspects, the partial wake state 304 may be referred to as a quick wake state because a minimal subset of hardware resources are powered for a short time to process the remaining packets before returning to the sleep state 302.

When the remaining packets cannot be processed by resources available in the partial wake state 304, such as when the remaining packets are part of a complex task 316, the network device enters the full-on state 306. The full-on state 306 further increases processing capabilities of a network device, yet consumes more power than either the sleep state 302 or the partial wake state 304. All resources of the system firmware are available in the full-on state 306 for processing packets or complex tasks, such as print jobs, file serving, data streaming, and the like. Alternately or additionally, all of the hardware resources of the network device may be powered-on when none of the wake rules are applicable while transitioning from sleep state 302 to the full-on state 306.

These resources may enable a full-feature-set network stack having more packet processing capabilities than either the increased-feature-set network stack or the reduced-feature-set network stack. The remaining packets can then be processed in the full-on state 306 before returning to the sleep state 302 after an inactivity timeout 318. In some cases, the inactivity timeout 318 may be user-configurable or pre-empted by user interaction with a hardware switch configured to initiate a transition back to the sleep state 302.

By transitioning between the sleep state 302, the partial wake state 304, and/or the full-on state 306, the network device can maintain a network presence while using only a minimal set of resources. Although transitioning between these power states includes periodic waking of the system firmware 312, a duty cycle of time awake relative to time sleeping can be kept low enough to reduce power consumption below conventional low-power thresholds. For example, an average power consumption of a network device can be represented by Equation 1, as shown below.

$$\text{Power}_{Average} = (\text{Power}_{Partial\text{-}Wake} \times \text{DutyCycle}) + (\text{Power}_{Sleep} \times (1 - \text{DutyCycle}))$$

Equation 1. Average Power Consumption

With reference to Equation 1., $\text{Power}_{Partial\text{-}Wake}$ is an amount of power consumed in the partial wake state 304, $\text{Power}_{Sleep}$ is an amount of power consumed in the sleep state 302, and DutyCycle is an amount of time the network device spends in the partial wake state 304 relative to an amount of time spent in the sleep state 302. By way of example, consider the following parameters: a desired low-power consumption goal is ½ Watts, power consumed in a baseline sleep state is ¼ Watts, and power consumed in a quick wake state is 13/12 Watts. Solving Equation 1 for a desired duty cycle would result in a duty cycle of 0.30, or 30%. Thus, the desired power consumption can be achieved as long as the network device was in the partial wake state 304 no more than 3 out of every 10 seconds.

Figure 4:
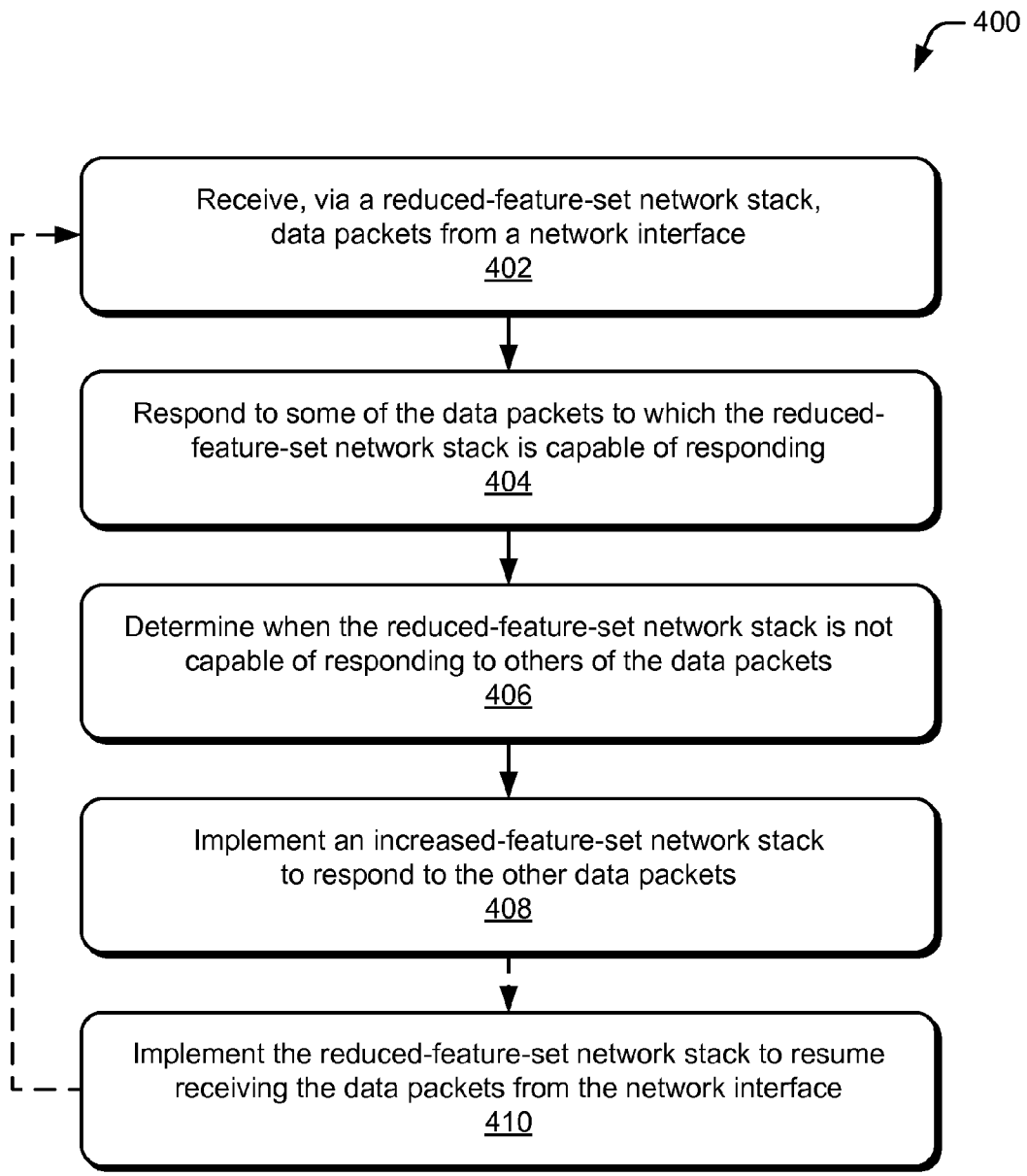
FIG. 4 illustrates an example method of low-power firmware in accordance with one or more aspects.

FIG. 4 illustrates an example method 400 of low-power firmware in accordance with one or more aspects. The following discussion describes techniques for enabling low-power firmware in network devices. These techniques can be implemented using the previously described environment or entities, such as the power manager 142 of FIG. 1, low-power manager 230 of FIG. 2, or system-power manager 232 of FIG. 2 embodied in a network device. These techniques include methods illustrated in FIGS. 4, 5, and 6, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environment 100 of FIG. 1, entities of FIG. 2, and the power states of FIG. 3 by way of example. Such reference is not to be taken as limited to operating environment 100 but rather as illustrative of one of a variety of examples.

At 402, data packets are received from a network interface via a reduced-feature-set network stack. In some aspects, the reduced-feature-set network stack is implemented by executing a first set of code on a first subset of hardware resources of a network device. The first set of code may be a low-power firmware executed on low-power hardware, such as being executed from a small SRAM memory area by a side processor of the network device.

At 404, some of the data packets are responded to or processed via the reduced-feature-network stack. These data packets are those to which the reduced-feature-set network stack is capable of responding. For example, the data packets may be associated with network protocols or requests that do not traverse upper layers of a network stack. These data packets may include a variety of data packets or requests, such as ICMP messages, IPv4 ARP messages, or IPv6 ND requests.

At 406, it is determined when the reduced-feature-set network stack is not capable of responding to others of the data packets. In some aspects, the other data packets are passively filtered by filter logic, which indicates when additional resources or an increased-feature-set network stack is needed to process the other packets. In the context of FIG. 2, the filter logic 214 may filter data packets that the micro-network stack 216 is unable to process. The filter logic 214 can then signal the low-power manager 230 to initiate the system firmware 204 via system-power manager 232 to process the data packets which the micro-network stack 216 was unable to process.

At 408, an increased-feature-set network stack is implemented to respond to the other data packets. In some aspects, the increased-feature-set network stack is implemented by executing a second set of code on a second subset of hardware resources of the network device. The second set of code may be a system firmware executed on non-low-power hardware, such as being executed from a DRAM memory area by a main processor of the network device. Alternately or additionally, a full-feature-set network stack may be implemented when the increased-feature-set network stack is unable to process the other data packets.

Optionally at 410, the reduced-feature-set network stack is implemented to resume receiving the data packets from the network interface. Implementing the reduced-feature-set network stack may include transitioning execution of the system firmware to execution of the low-power firmware. In some aspects, a transition between the firmware is coordinated by a system-power manager of the system firmware and a low-power manager of the low-power firmware. Once the reduced-feature-set network stack is implemented, the method 400 may return to 402 to implement another iteration of the method 400.

Figure 5:
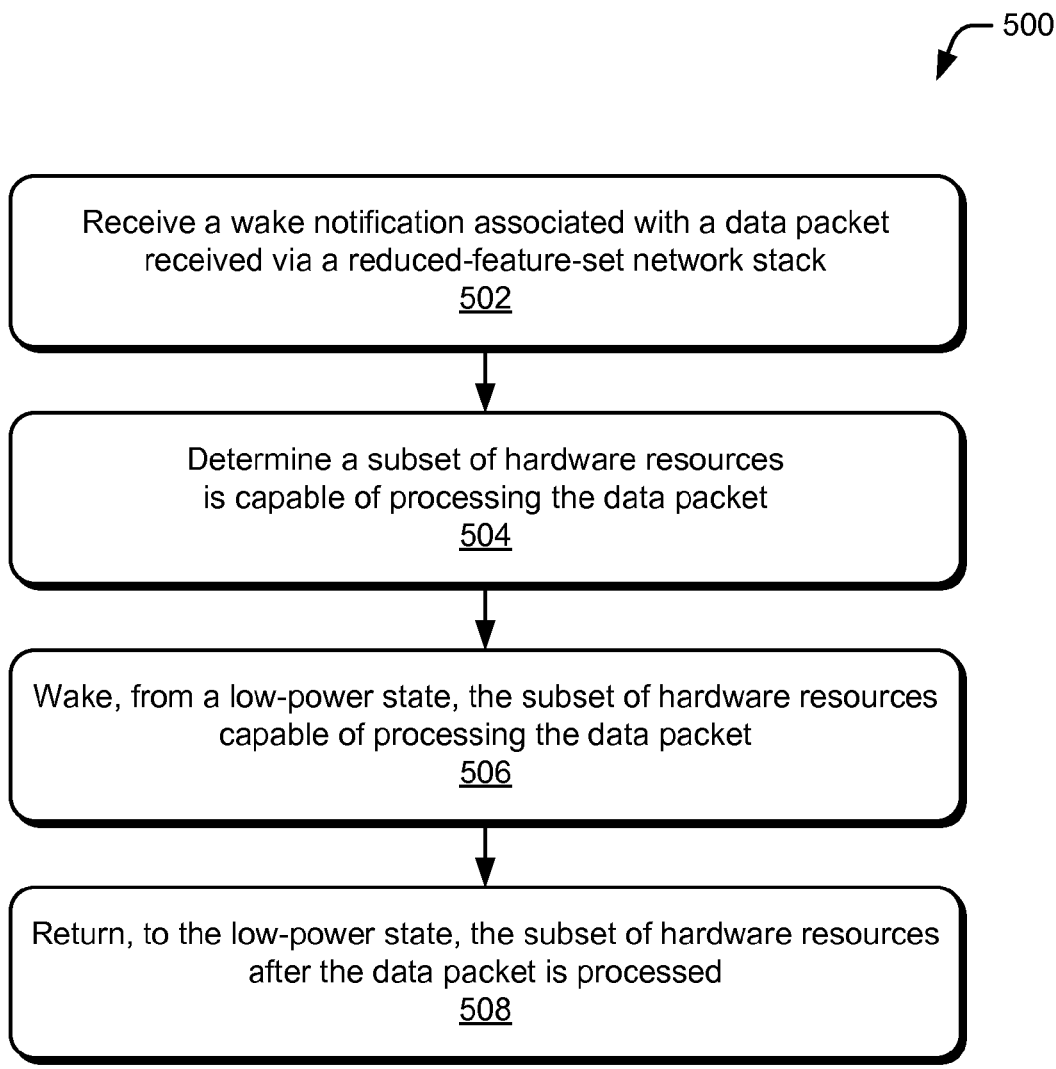
FIG. 5 illustrates another example method of low-power firmware in accordance with one or more aspects.

FIG. 5 illustrates another example method 500 of low-power firmware in accordance with one or more aspects. Operations of method 500 may be performed by various entities described with reference to FIGS. 1-3, such as the system-power manager 232 of FIG. 2.

At 502, a wake notification is received that is associated with a data packet received via a reduced-feature-set network stack of a network device. The wake notification is received while the network device is in a sleep state or low-power state. The data packet may be a transport layer or application layer data packet that the reduced-feature-set network stack is not capable of processing. In some aspects the wake notification is received from another instance of firmware, such as a low-power firmware or low-power manager associated with the other instance of the firmware.

At 504, a subset of hardware resources capable of processing the data packet is determined. The subset of hardware resources may be selected from multiple subsets of hardware resources associated with a full-feature-set network stack of the network device. In some cases, each of the multiple subsets of hardware resources corresponds to a respective network interface or network application. Alternately or additionally, determining the subset of hardware resources may be based on the wake notification or information associated with the wake notification. For example, the wake notification may indicate a network application with which the data packet is associated. Based on this indication, it may be determined that a subset of hardware resources associated with the particular network application is capable of processing the data packet. In some cases, all of the hardware resources may be activated if selection of a particular subset of hardware resources is not optimal.

At 506, the subset of hardware resources capable of processing the data packet is activated from a low-power state. Activating the subset of hardware resources may be effective to cause the network device to transition from the sleep state to a partial wake state. While in the partial wake state, an increased-feature-set network stack is implemented to process the data packet.

When the increased-feature-set network stack is not able to process the packet, additional hardware resources can be activated to process the data packet. Activating the additional hardware resources may be effective to cause the device to transition from the partial wake state to a full-on state, in which a full-feature-set network stack is implemented. While in the full-on state, the network device consumes more power than while in the partial wake state, yet may process more complex packets, job requests, and the like.

At 508, the subset of hardware resources is returned to the low-power state after the data packet is processed. Returning the resources to the low-power state may be responsive to completing processing of the packet or an inactivity timeout. In some aspects, returning the subset of hardware resources to the low-power state is effective to enable the network device to re-enter the sleep state or low-power state from the partial wake state or full-on state. In some aspects, transitioning back to the sleep state or low-power state is coordinated between a low-power manager and a system-power manager of the network device.

Figure 6:
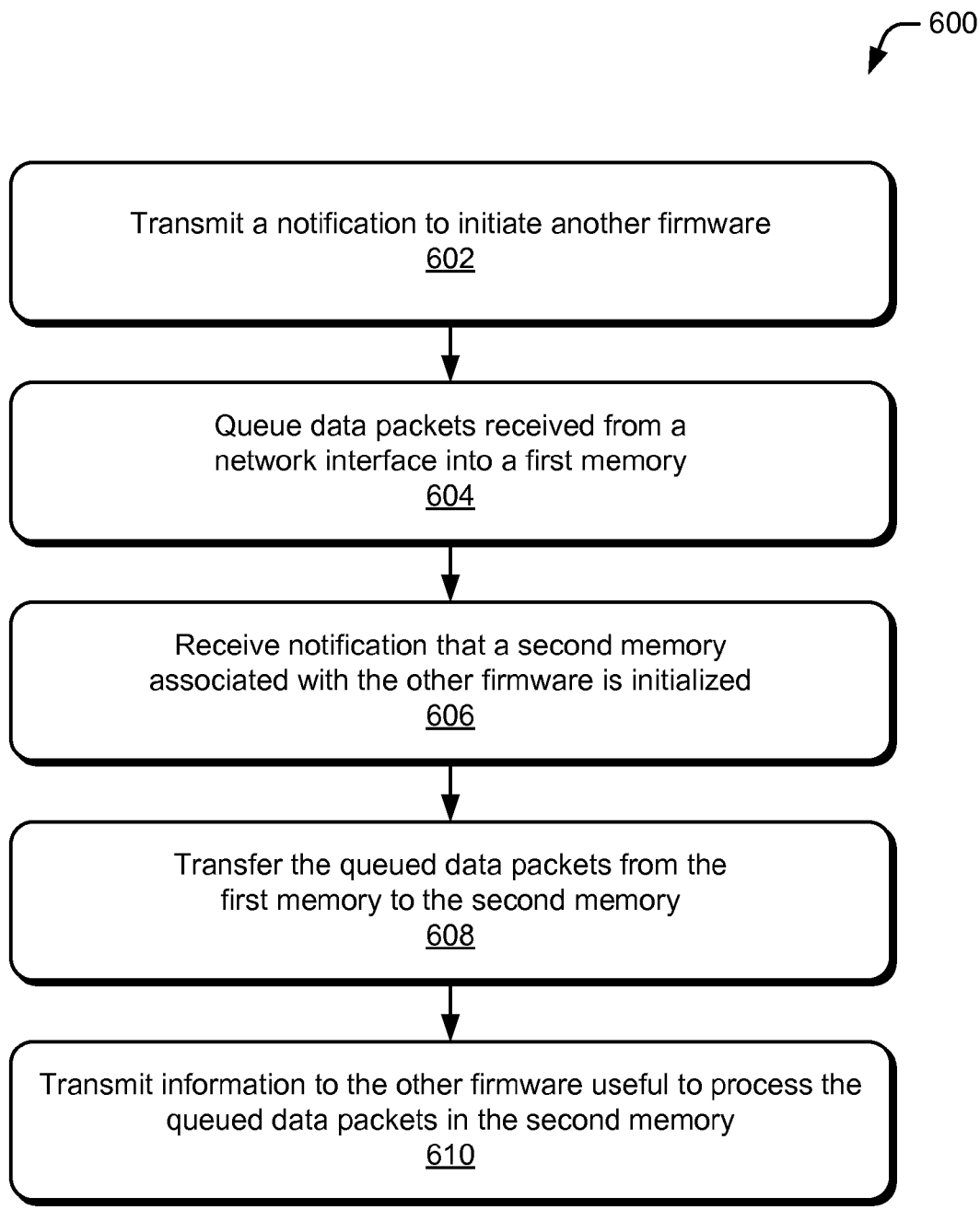
FIG. 6 illustrates an example method of transferring data packets to another firmware in accordance with one or more aspects.

FIG. 6 illustrates an example method of transferring data packets to another firmware in accordance with one or more aspects. Operations of method 600 may be performed by various entities described with reference to FIGS. 1-3, such as the low-power manager 230 of FIG. 2.

At 602, a notification is transmitted to another firmware of a network device effective to initiate execution of the other firmware. The notification may be transmitted responsive to determining that a reduced-feature-set network stack is unable to process or respond to a data packet. In some aspects, the notification is transmitted or transferred from an instance of a network device's low-power firmware to an instance of the network device's system firmware.

At 604, data packets received from a network interface are queued into a first memory. The data packets may be data packets that traverse higher layers of a network stack, such as protocol layers or application layers. In some aspects, the first memory is an area of SRAM configured as a receive buffer. Alternately or additionally, the low-power firmware may execute from another area of the SRAM.

At 606, a notification is received that indicates a second memory is initialized. Typically, the second memory is memory associated with the system firmware of the network device, such as DRAM or DDR. Thus the low-power firmware continues to queue the data packets until the DRAM or DDR is initialized form a low-power or sleep state.

At 608, the queued data packets are transferred from the first memory to the second memory. In some aspects, the low-power firmware copies the queued data packets from the first memory to the second memory. For example, a low-power manager of the low-power firmware can copy the queued data packets from the SRAM into DRAM that is configured as a receiving descriptor ring of a system network driver.

At 610, information useful to process the queued data packets in the second memory is transmitted to the other firmware. This information may include a description of the queued data packets that can be leveraged to determine which hardware resources are useful to process said data packets. Alternately or additionally, responsibility of interrupt service routine (ISR) processing is transferred to the other firmware. Once these operations are complete, the other firmware can initiate a partial wake state or full-on state in which the queued data packets are processed.

Figure 7:
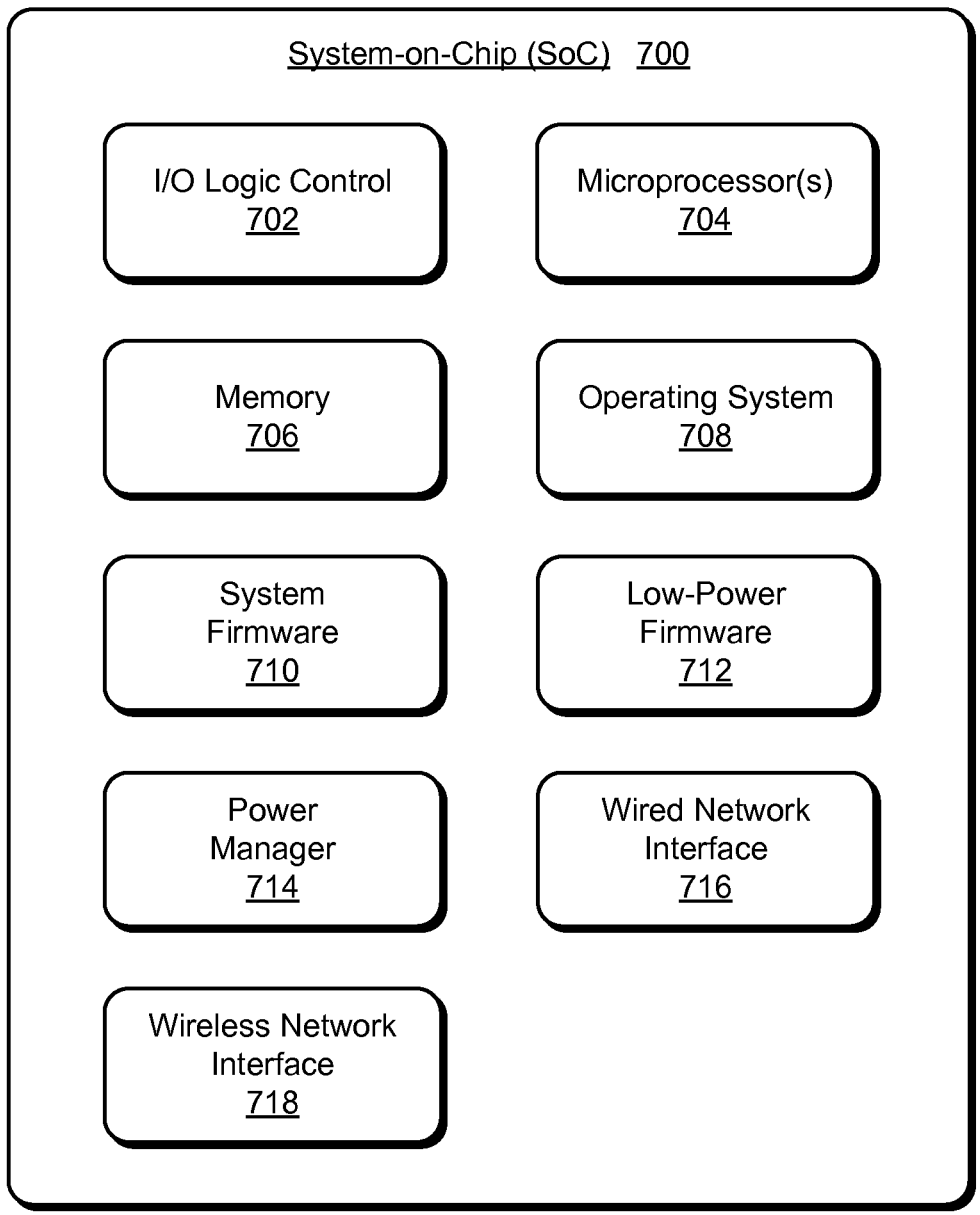
FIG. 7 illustrates various components of a System-on-Chip (SoC) that can implement aspects of low-power firmware.

FIG. 7 illustrates a System-on-Chip (SoC) 700, which can implement various aspects of low-power firmware. A SoC can be implemented in any suitable device, such as a video game console, IP-enabled television, smart-phone, desktop computer, laptop computer, access point, wireless router, cellular broadband router, tablet computer, server, network-enabled printer, set-top box, printer, scanner, camera, picture frame, home appliance, thermostat, home automation device, and/or any other type of electronic device. Alternately or additionally, components of the SoC 700 can be implemented as various other electronic devices, such as an application processor, baseband processor, application-specific integrated circuit (ASIC), field programmable gate array (FPGA), and so on.

The SoC 700 can be integrated with electronic circuitry, a microprocessor, memory, input-output (I/O) logic control, communication interfaces, other hardware, firmware, and/or software needed to provide functionalities of a device, such as any of the above-listed devices. The SoC 700 can also include an integrated data bus or crossbar (not shown) that couples the various components of the SoC for data communication between the components. A network device that includes the SoC 700 can also be implemented with many combinations of differing components. In some cases, these differing components may be configured to implement concepts described herein over various network or data interfaces.

In this example, the SoC 700 includes various components such as an input-output (I/O) logic control 702 (e.g., to include electronic circuitry) and microprocessor(s) 704. The SoC 700 also includes a memory 706, which can be any type and/or combination of RAM, SRAM, DRAM, low-latency nonvolatile memory, ROM, one-time programmable (OTP) memory, and/or other suitable electronic data storage. Alternately or additionally, the SoC 700 may comprise a data interface (not shown) for accessing additional or expandable off-chip memory, such as external SRAM, DRAM, or flash memory. The SoC 700 can also include various firmware and/or software, such as operating system(s) 708, system firmware 710, and low-power firmware 712, such as the low-power firmware 146 and system firmware 144 as described with reference to FIG. 1. The operating systems 708, system firmware 710, and low-power firmware 712 can be computer-executable instructions maintained by the memory 706 and executed by the microprocessors 704. The SoC 700 may also include other various communication interfaces and components embodied as hardware, firmware, software, or any suitable combination thereof.

The SoC 700 also includes a power manager 714, wired network interface 716, and wireless network interface 718 (any of which may be embodied as disparate or combined components), such as those described with reference to FIG. 1. Although not shown, the system firmware 710 and low-power firmware 712 may each include code or instructions for implementing, in whole or part, the power manager 714. Examples of these various components, functions, and/or entities, and their corresponding functionality, are described with reference to the respective components of the environment 100 and various configurations as illustrated by FIGS. 2 and 3.

The power manager 714, either independently or in combination with other entities (e.g., low-power manager 230 and system power manager 232), can be implemented as computer-executable instructions maintained by the memory 706 and executed by the microprocessor 704 to implement various embodiments and/or features described herein. The power manager 714 may also be provided integral with other entities of the SoC 700, such as integrated a controller associated with various network interfaces or another suitable software, firmware, or hardware component within SoC 700. Alternatively or additionally, the power manager 714 and the other components can be implemented as hardware, firmware, fixed logic circuitry, or any combination thereof that is implemented in connection with the network interfaces and/or other signal processing and control circuits of the SoC 700.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
receiving data packets at a network interface of a device, the data packets received via a reduced-feature-set network stack operating over a subset of network drivers, the reduced-feature-set network stack and the subset of network drivers implemented by a first set of code executing on a subset of hardware resources of the network interface;
responding, via the reduced-feature-set network stack, to the data packets to which the reduced-feature-set network stack is capable of responding;
determining when the reduced-feature-set network stack is not capable of responding to one or more of the data packets received at the network interface of the device; and
initiating execution of a second set of code on the hardware resources of the network interface to implement an increased-feature-set network stack operating over the network drivers to respond to the one or more data packets to which the reduced-feature-set network stack is not capable of responding.

2. The method as recited in claim 1, wherein:
the first set of code includes a first firmware;
the second set of code includes a second firmware;
a performance level of the subset of hardware resources is lower than a performance level of the hardware resources; and
execution of the first firmware on the first subset of hardware resources of the network interface consumes less power than execution of the second firmware on the hardware resources of the network interface.

3. The method as recited in claim 2, wherein the subset of hardware resources includes less memory than the hardware resources.

4. The method as recited in claim 1, further comprising and subsequent to initiating execution of the second set of code, queuing additional data packets received at the network interface into a memory space of the subset of hardware resources until another memory space of the hardware resources is initialized.

5. The method as recited in claim 4, further comprising transferring a queue of the additional data packets from the memory space to the other memory space once the other memory space is initialized.

6. The method as recited in claim 4, wherein the memory space is configured in static random-access memory (SRAM) and the other memory is configured in dynamic random-access memory (DRAM).

7. The method as recited in claim 1, wherein the reduced-feature-set network stack includes an Internet protocol (IP) layer configured to respond to Internet layer or network layer data packets.

8. The method as recited in claim 7, wherein the reduced-feature-set network stack further includes respective modules configured to respond to Internet control message protocol (ICMP) messages, Internet protocol version 4 (IPv4) address resolution protocol (ARP) messages, or Internet protocol version 6 (IPv6) neighbor discovery (ND) requests.

9. A method comprising:
receiving a wake notification associated with a data packet received via a reduced-feature-set network stack of a device, the reduced-feature-set network stack operating over a subset of network drivers and a first subset of hardware resources of the device;
determining, based on the wake notification, a second subset of hardware resources of the device that is capable of processing the data packet, the hardware resources associated with a full-feature-set network stack of the device that operates over a full set of network drivers;
waking the second subset of hardware resources from a low-power state to process the data packet via the full-feature-set network stack; and
returning the second subset of hardware resources to the lower-power state after the data packet is processed.

10. The method as recited in claim 9, further comprising waking additional hardware resources of the device from the low-power state to process the data packet in response to determining that the second subset of hardware resources is not capable of processing the data packet.

11. The method as recited in claim 10, wherein waking the second subset of hardware resources is effective to cause the device to enter a partial wake state and waking the additional hardware resources is effective to cause the device to transition from the partial wake state to a full-on state.

12. The method as recited in claim 11, wherein the device consumes less power while operating in the partial wake state than when operating in the full-on state.

13. The method as recited in claim 9, wherein determining the second subset of hardware resources is also based on a set of wake rules that correspond to a particular network protocol or network application.

14. The method as recited in claim 9, wherein the data packet with which the wake notification is associated is a transport layer data packet or an application layer data packet.

15. A System-on-Chip comprising:
one or more microprocessors configured to execute code to implement functionalities of a network device;
a network interface configured to enable the network device to communicate data packets over a network;
one or more memory areas maintaining:
a first set of code, that when executed, implements a reduced-feature-set network stack over a subset of network drivers and a subset of hardware resources of the network interface;

a second set of code, that when executed, implements a full-feature-set network stack over a full set of network drivers and the hardware resources of the network interface; and a power manager configured to:

execute the first set of code to implement the reduced-feature-set network stack for responding to the data packets received via the network interface;

determine when the reduced-feature-set network stack is not capable of responding to one or more of the data packets received via the network interface; and transition from execution of the first set of code to execution of the second set of code effective to enable the full-feature-set network stack to respond to the one or more data packets.

16. The System-on-Chip as recited in device of claim 15, wherein the first set of code includes a first firmware and the second set of code includes a second firmware.

17. The System-on-Chip as recited in device of claim 15, wherein the first set of code is executed by a first of the one or more microprocessors and the second set of code is executed by a second of the one or more microprocessors.

18. The System-on-Chip as recited in device of claim 15, wherein the first set of code is executed by the one or more processors at a first frequency and the second set of code is executed by the one or more processors at a second frequency that is lower than the first frequency.

19. The System-on-Chip as recited in device of claim 15, wherein to transition from execution of the first set of code to execution of the second set of code includes ceasing execution of the first set of code and initiating execution of the second set of code.

20. The System-on-Chip as recited in device of claim 15, wherein the network interface is configured to communicate data over a wireless or a wired network.

* * * * *